United States Patent [19]
Arnesen et al.

[11] 3,970,814
[45] July 20, 1976

[54] METHOD FOR REPAIRING INGOT MOLDS AND APPARATUS THEREFOR

[75] Inventors: Arne Georg Arnesen, Vagsbygd, Norway; Jan Schokkenbroek, Alkmaar, Netherlands

[73] Assignee: Elkem-Spigerverket A/S, Oslo, Norway

[22] Filed: Sept. 10, 1974

[21] Appl. No.: 504,823

[30] Foreign Application Priority Data
Sept. 13, 1973 Norway.............................. 3578/73

[52] U.S. Cl.................................. 219/76; 219/145
[51] Int. Cl.² ......................................... B23K 9/04
[58] Field of Search.......... 219/76, 137 R, 137 WM, 219/145, 73

[56] References Cited
UNITED STATES PATENTS
2,191,471  2/1940  Hopkins............................... 219/76
3,748,434  7/1973  Girard.............................. 219/73 X Primary Examiner—J. V. Truhe
Assistant Examiner—David A. Tone
Attorney, Agent, or Firm—Eyre, Mann, Lucas & Just

[57] ABSTRACT

An improved method for repairing cavities in ingot molds is disclosed. The method comprises feeding repair material through a hollow electrode into the area of the cavity whereby the ingot mold being repaired can be maintained continuously molten in the area of repair.

8 Claims, 1 Drawing Figure

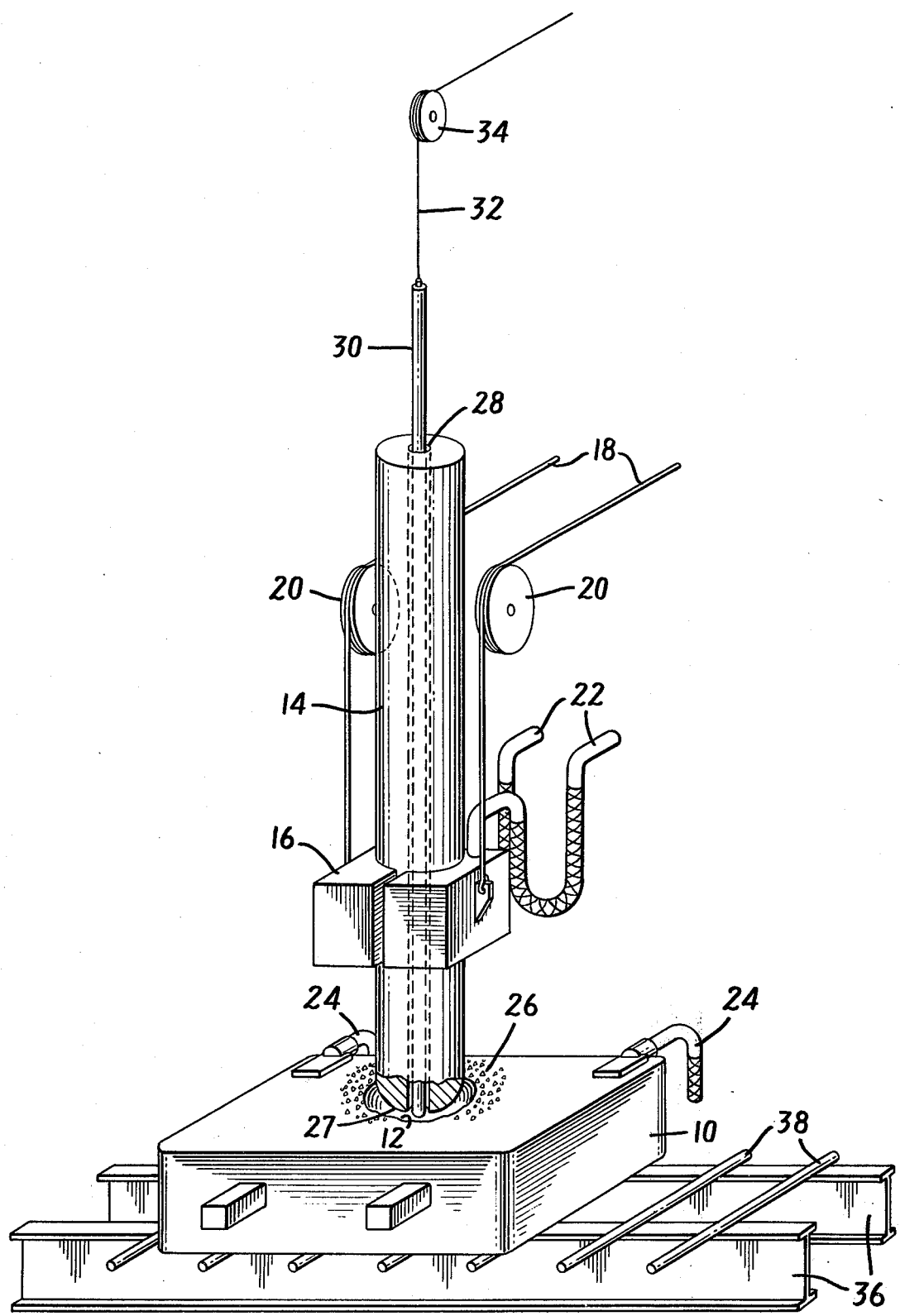

METHOD FOR REPAIRING INGOT MOLDS AND APPARATUS THEREFOR

The present invention relates to an improved process for repairing cavities in ingot molds and an apparatus therefor.

As is well known in the art, ingot molds of cast iron which are used in the steel industry for forming steel ingot will, after a period of time, require repair because of cavities formed therein. The usual way to effect this repair is to cause the mold in the area of the cavity to become molten by means of heat supplied through an electrode whereafter the electrode is moved out of position and molten repair material, usually also cast iron and containing fluxes, cover material and the like, is poured therein. Thereafter, the electrode is again used to heat the entire area to try to attain the best possible adhesion of the repair material to the area of the ingot mold to be repaired.

While this system has been employed and certainly works, it has a number of inherent disadvantages. For example, when the electrode is removed from position for the pouring in of the repair material, the interruption in the heating process causes a cooling down of the portion of the ingot mold which is molten. This is undesirable both because it can affect adhesion of the repairing material to the mold and because it requires additional energy to again heat the mold to try to obtain better adhesion of the repair material in the mold.

A further disadvantage of the prior art process is that the coke or other conducting material built up around the electrode will fall into the cavity area when the electrode is moved and will have to be cleaned out before the repair material is added. This is both an unpleasant and time consuming operation.

In accordance with the present invention, the standard electrode used for heating the ingot mold or other cast iron material to be repaired in the area of the cavity is made with a hollow core extending through its length. By this expedient, it is possible to add the repair material through the center of the electrode so that it is not necessary to remove the electrode and interrupt the heating of the mold being repaired. With this method, the possibility of an improper repair is substantially reduced since both the portion of the mold to be repaired and the repair material are kept molten throughout the period of repair. Further, since the electrode is not moved during repair, there is no problem of the coke or other conductive material falling into the cavity necessitating cleaning out of the cavity before addition of the repair material. There is also economic advantage with the process and apparatus of the present invention in that since the process is continuous and without interruption of the heating, there is substantial reduction in the amount of energy required to repair a given cavity.

These and other features of the present invention may be more fully understood with reference to the drawing which shows a typical apparatus useful in the process of the present invention.

In the FIGURE there is shown the bottom of a cast iron ingot mold 10 having a cavity 12 therein, a frequent occurrence in the bottoms of ingot molds used in the steel industry. An electrode 14 held in electrode holder 16 which is supportd by guide wires 18 in conjunction with wheels 20 has been positioned in close proximity to the cavity 12. In order to effect heating of that area of the mold to be repaired, current is supplied to the electrode 14 from the electrode holder 16 through wires 22 and is grounded through the ingot mold bottom by means of wires 24. A supply of coke or other conductive material 26 is built up around the electrode tip 27 in the area of the cavity 12 in the mold 10. This coke or other conductive material provides a path for the current from the electrode to the ingot mold in order to effect even heating of the ingot mold in the area to be repaired. Sufficient charge is supplied to the electrode to cause the area of the mold in the area of the cavity to become molten.

In accordance with the present invention, the electrode 14 is made with a hollow center 28 so that repair material 30 can be introduced directly to the area of the mold to be repaired while that area of the mold is molten and while heat is being continuously supplied to it by means of the electrode. In this manner, it is not necessary to remove the electrode to add the repair material and, since the electrode is not removed, the carbon or other conducting material will not fall into the cavity and have to be cleaned out.

The repair material 30 will comprise cast iron rods since it is cast iron molds which are being repaired. These rods are suitably supported and lowered by guide wire 32 in conjunction with wheel 34. In addition to the cast iron rods introduced through the hollow center of the electrode, fluxes and covering material may also be supplied if desired. It will be appreciated that since the cast iron rod repair material only becomes molten as it reaches the molten area of the ingot mold in the area of the cavity, it is a comparatively simple matter to control the amount of repair material to be added so that there is not added either too little or too much material which can be experienced where a standard electrode is employed and then removed before adding molten repair material.

For ease of operation and in order to handle relatively heavy ingot mold bottoms, it is preferred that means be provided for transporting the ingot mold bottoms. In the FIGURE these means are supplied by I beams 36 in combination with rollers 38.

In breakaway view in the area of the cavity 12 is shown the bottom of the electrode 14 including the electrode tip 27. In accordance with a preferred embodiment of the present invention and as shown, the electrode tip has a profile which is of conical shape and insofar as practicable adapted to the shape of the cavity. It has been found that shaping the tip of the electrode in this manner effects a better repair of the ingot mold cavity. Thus, cavities having a relatively small diameter but relatively great depth can be better repaired if the electrode has a more pronounced conical tip than that shown in the drawing where the cavity being repaired is of relatively great diameter but comparatively shallow.

While the dimensions of the electrode will depend to a considerable degree on the size of the cavity to be repaired, it is preferred to use an electrode with an outer diameter of from about 25 to about 75 cm and an inner diameter of from about 4 to about 15 cm. In the most preferred embodiment, the electrode has an outer diameter from 30 to 40 cm and an inner diameter of 6 to 9 cm.

In one specific example an ingot mold bottom of cast iron having a weight of nine tons was repaired. The ingot mold bottom had a thickness of 40 cm and had a cavity corresponding to 120 kg of iron. the cavity was placed beneath a hollow electrode which had an outer diameter of 35 cm and an inner diameter of 7.5 cm. The tip of the electrode was conically shaped to approximately the shape of the cavity. A heap of coke as conductive material was built up around the electrode tip to a diameter of about one meter and a height of about 80 cm.

Thereafter, an electrical current of 46 volts and approximately 15,500 amps was supplied and after 48 minutes the material in the cavity was molten and oxides had been reduced. Fluxes and covering material were then supplied through the hollow core of the electrode together with cast iron rods of approximately 30 mm in diameter. The cast iron rods were bundled into groups of three and had a total weight of 120 kg. A 1 kg lump of FeSi was also supplied through the hollow core of the electrode. The supply of electrical current was continued for 30 minutes.

The resulting repaired ingot mold bottom was tested and was found to meet the specifications required of new ingot mold bottoms. A number of additional tests were also conducted on cavities of varying dimension and it was confirmed that the best results are obtained in terms of repair when the electrode tip has a conical shape which is adapted to the shape of the cavity insofar as practicable.

It will be understood that the claims are intended to cover all changes and modifications of the preferred embodiments of the invention, herein chosen for the purpose of illustration, which do not constitute departures from the spirit and scope of the invention.

What is claimed is:

1. A method of repairing cavities in cast iron parts comprising:
    a. placing an electrode into the area of the cavity to be repaired, said electrode having a longitudinal extent and having a hollow longitudinal core;
    b. building up conductive material on the cast iron part to be repaired about the periphery of the tip of the electrode to establish a path for current to travel from the electrode to the cast iron part;
    c. supplying electrical charge to the electrode in sufficient amount to cause the cast iron part to become molten in the area of the cavity;
    d. feeding repair material comprising cast iron to the cavity in the cast iron part through the hollow core of the electrode while continuing to supply the electrical charge to the electrode; and
    e. continuing to feed electrical charge to the electrode until the repair material becomes molten and a good repair is effected.

2. The method of claim 1 wherein the repair material includes fluxes and covering material.

3. Apparatus for repair of cavities in cast iron parts comprising:
    a. a substantially non-consumable electrode having a longitudinal extent and having a hollow core along its longitudinal extent;
    b. means for bringing the cast iron part into proximity with said electrode in the area of the cavity to be repaired;
    c. means for supplying an electrical charge to the electrode in sufficient amount to cause the cavity area of the cast iron part to become molten; and
    d. means for supplying repair material comprising cast iron to the cavity of the cast iron part through the hollow core of the non-consumable electrode.

4. The apparatus of claim 3 wherein the tip of the electrode in the proximity of the cavity has a curved shape.

5. The apparatus of claim 4 wherein the curved shape of the tip of the electrode is adapted insofar as practicable to correspond to the shape of the cavity.

6. Apparatus for repair of cavities in cast iron parts comprising:
    a. a substantially non-consumable electrode having a longitudinal extent and having a hollow core along its longitudinal extent;
    b. means for bringing the cast iron part into proximity with said electrode in the area of the cavity to be repaired;
    c. means for supplying an electrical charge to the electrode in sufficient amount to cause the cavity area of the cast iron part to become molten;
    d. means for supplying repair material comprising cast iron to the cavity of the cast iron part through the hollow core of the non-consumable electrode; and
    e. said electrode having an outer diameter of from about 25 to about 75 cm and an inner diameter of from about 4 to about 15 cm.

7. The apparatus of claim 6 wherein the electrode has an outer diameter of from 30 to 40 cm and an inner diameter of from 6 to 9 cm.

8. Apparatus for repair of cavities in cast iron parts comprising:
    a. a substantially non-consumable electrode having a longitudinal extent and having a hollow core along its longitudinal extent;
    b. means for bringing the cast iron part into proximity with said electrode in the area of the cavity to be repaired;
    c. means for supplying an electrical charge to the electrode in sufficient amount to cause the cavity area of the cast iron part to become molten;
    d. means for supplying repair material comprising cast iron to the cavity of the cast iron part through the hollow core of the non-consumable electrode; and
    e. means for independently moving the electrode and repair material relative to the cavity.

* * * * *